(12) United States Patent
Fujimaki et al.

(10) Patent No.: US 7,045,175 B2
(45) Date of Patent: May 16, 2006

(54) MAGNETIC RECORDING MEDIUM AND METHOD FOR MANUFACTURING THE SAME

(75) Inventors: Shigehiko Fujimaki, Machida (JP); Toru Yatsue, Odawara (JP); Yuuichi Kokaku, Yokohama (JP); Toshinori Ono, Odawara (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 10/377,678

(22) Filed: Feb. 28, 2003

(65) Prior Publication Data

US 2003/0228496 A1 Dec. 11, 2003

(30) Foreign Application Priority Data

May 29, 2002 (JP) ............................. 2002-154942
Jul. 17, 2002 (JP) ............................. 2002-208359

(51) Int. Cl.
*B05D 3/14* (2006.01)

(52) U.S. Cl. ..................... 427/523; 427/525; 427/530; 427/131; 427/533; 427/577; 204/192.15; 204/192.38

(58) Field of Classification Search ................ 427/523, 427/525, 530, 131, 533, 577; 204/192.15, 204/192.38; 428/833.2, 833.5
See application file for complete search history.

(56) References Cited

U.S. PATENT DOCUMENTS

| | | | | |
|---|---|---|---|---|
| 4,664,976 A | * | 5/1987 | Kimura et al. | ............... 428/336 |
| 5,763,087 A | * | 6/1998 | Falabella | ..................... 428/408 |
| 5,858,477 A | * | 1/1999 | Veerasamy et al. | ......... 427/562 |
| 6,524,687 B1 | * | 2/2003 | Horng et al. | ................ 428/216 |
| 6,576,328 B1 | * | 6/2003 | Deng et al. | .................. 428/212 |
| 6,638,608 B1 | * | 10/2003 | Gui et al. | .................... 428/212 |
| 6,689,425 B1 | * | 2/2004 | Ma et al. | ..................... 427/562 |

FOREIGN PATENT DOCUMENTS

| | | |
|---|---|---|
| JP | 2001-063717 | 3/2001 |
| JP | 2002-32907 | 1/2002 |

OTHER PUBLICATIONS

A.C. Ferrari, et al., "Density, $sp^3$ Fraction and Cross-Sectional Structure of Amorphous Carbon Films Determined by X-Ray Reflectivity and Electron Energy-Loss Spectroscopy," *American Physical Society* (2000) vol. 62, No. 16:11089-11103.

Xu, Shi, et al., "Properties of Carbon Ion Deposited Tetrahedral Amorphous Carbon Films as a Function of Ion Energy," *J. Appl. Phys.* (1996) vol. 79, No. 9:7234-7240.

Robertson, J., "Ultrathin Carbon Overcoats for Magnetic Storage Technology" *TRIB* (1999) vol. 9:39-45.

(Continued)

*Primary Examiner*—Stevan A. Resan
(74) *Attorney, Agent, or Firm*—Townsend and Townsend and Crew LLP

(57) ABSTRACT

A method for manufacturing a magnetic recording medium includes forming a first protective layer of first material over a magnetic film provided on a substrate. The first protective layer has a thickness of about 0.2 nm to about 2 nm. A second protective layer of second material is formed over the first protective layer by driving ions of the second material into the first protective layer. The first protective layer is configured to prevent the ions of the second material from penetrating into the magnetic film.

16 Claims, 11 Drawing Sheets

OTHER PUBLICATIONS

Chapman *Glow Discharge Processes: Sputtering and Plasma Etching*, chapter 3, pp. 51-65, Wiley-Interscience publisher (Sep. 1980).

Shi et al. "The Double Bend Filtered Cathodic Arc Technology and Its Tribology Applications," Journal of Japanese Society of Tribologists 45:27-32 (2000).

Yamashina et al. *Fundamentals and Application of Surface Analysis*, pp. 56-64, Tokyo University Press publisher (1991).

Yushkov et al. "Ion Velocities in Vacuum Arc Plasmas," Journal of Applied Physics 88:5618-5622 (2000).

* cited by examiner

Mass number of target atom

MAGNETIC RECORDING MEDIUM AND METHOD FOR MANUFACTURING THE SAME

CROSS-REFERENCES TO RELATED APPLICATIONS

The present application is related to and claims priority from Japanese Patent Application No. 2002-154942, filed on May 29, 2002, and Japanese Patent Application No. 2002-208359, filed on Jul. 17, 2002.

BACKGROUND OF THE INVENTION

The present invention relates to a method for manufacturing a magnetic recording medium.

In a conventional method for manufacturing a magnetic recording medium, an underlying film comprising Cr, or Cr alloy such as Cr—V, Cr—Ti, etc. is formed by magnetron sputtering method in part to ensure crystal orientation and particle size control of the recording magnetic film on a very smooth nonmagnetic substrate, and a recording magnetic film comprising CoCrTa, CoCrPt, etc. is formed by magnetron sputtering method on the underlying film, so that an axis of easy magnetization runs in parallel or almost in parallel to the substrate. In addition, as the recording magnetic film, a perpendicular magnetic film comprising Co or Co—Ni having vertical magnetic anisotropy or a vertical magnetizing film comprising Co—Cr formed on a soft magnetic material such as Permalloy film is used. Further, a protective film containing carbon as major component is formed by physical vapor deposition (PVD) method or by chemical vapor deposition (CVD) method based on plasma process.

In the growing process of the carbon film, the difference of deposited particle energy based on the film-forming process is reflected in physical property of the film. For instance, average energy of sputter particles is about 5 eV and a gas used in plasma CVD has thermal motion energy of about 0.03 eV, and hydrocarbon ions are accelerated at several hundreds V. In general, elaborate tetrahedral carbon structure does not grow when low-energy-deposited particles are deposited under low pressure. In particular, in the surface deposition of hydrocarbon radicals, polymerization of polymers occurs. Generally, a PVD method uses ions having energy of about 2 eV to about 10 eV, and a CVD method uses particles having energy of about 0.03 eV.

BRIEF SUMMARY OF THE INVENTION

One embodiment of the present invention relates to the magnetic recording medium comprising at least an underlying film, a recording magnetic film, a protective film, and a lubricating film on a disk-like base material, the protective film being a multi-layer protective film formed on said recording magnetic film, and the uppermost layer of the multi-layer protective film being a carbon film having mass density of 2.5 g·cm$^{-3}$ or more. Alternatively, the lubricating film may not be included in another embodiment. In one implementation, at least one layer of said multi-layer protective film except the uppermost layer is a carbon film of 0.2 to 2 nm in thickness and having mass density lower than that of the uppermost layer. In another implementation, at least one layer of the multi-layer protective film except the uppermost layer is a film of 0.2 to 2 nm in thickness and contains at least hydrogen, nitrogen, boron, silicon, or fluorine in addition to carbon. In another implementation, at least one layer of said multi-layer protective film except the uppermost layer is a film of 0.2 to 2 nm in thickness and comprises silicon or its oxide, nitride, or carbide, or boron or its oxide, nitride, or carbide, or a nonmagnetic metal or its oxide, nitride, or carbide.

The magnetic recording medium according to the present embodiment is characterized in that nitrogen content of a first layer protective film of said multi-layer lamination film is in the range of 6 to 20 atomic %.

Another embodiment provides a method for manufacturing a magnetic recording medium, which comprises processes of sequentially forming at least an underlying film, a recording magnetic film, and a protective film on a disk-like base material, wherein a process for forming said protective film is a process for forming a multi-layer protective film on said recording magnetic film, and a process for forming the uppermost layer of said multi-layer protective film is a process for forming the film by injection of carbon ions derived from an arc plasma source.

Another embodiment provides a method for manufacturing a magnetic recording medium as described above, wherein a process forming at least one layer of said multi-layer protective film except the uppermost layer is a process to form a carbon film of 0.2 to 2 nm in thickness by magnetron sputtering method or by plasma CVD method.

Another embodiment provides a method for manufacturing a magnetic recording medium as described above, wherein a process for forming at least one layer of said multi-layer protective film except the uppermost layer in the processes for forming said multi-layer protective film is a process for forming a film of 0.2 to 2 nm in thickness, and said film contains hydrogen, nitrogen, boron, silicon, or fluorine in addition to carbon by magnetron sputtering method or by plasma CVD method.

Another embodiment provides a method for manufacturing a magnetic recording medium as described above, wherein a process for forming at least one layer of said multi-layer protective film except the uppermost layer in the process for forming said multi-layer protective film is a process for forming a film of 0.2 to 2 nm in thickness, and said film contains silicon or its oxide, nitride, or carbide, boron or its oxide, nitride, or carbide, or a nonmagnetic metal or its oxide, nitride, or carbide by magnetron sputtering method or by plasma CVD method.

Another embodiment provides a method for manufacturing a magnetic recording medium comprising at least an underlying layer, a recording magnetic film, or a protective film on a disk-like base material, wherein positive bias voltage is applied on a substrate for a certain period of time from the initiation of film formation in a film-forming process to form a protective film on said recording magnetic film by injection of carbon ions derived from an arc plasma source.

Yet another embodiment provides a method for manufacturing a magnetic recording medium comprising at least an underlying layer, a recording magnetic film, or a protective film on a disk-like base material, wherein a hydrocarbon gas such as methane, ethane, propane, butane, ethylene, propylene, butylene, acetylene, toluene, etc. is supplied only for a certain period of time from the initiation of film formation in a film-forming process to form a protective film on said recording magnetic film by injection of carbon ions derived from an arc plasma source.

Yet another embodiment provides a magnetic storage device, which comprises at least a magnetic recording medium for recording information and a magnetic head for carrying out writing and erasing of the information to and from the magnetic recording medium and for reading the information from the magnetic recording medium, wherein said magnetic recording medium comprises the magnetic recording medium provided by the invention as described above.

DETAILED DESCRIPTION OF THE INVENTION

Figure 1:
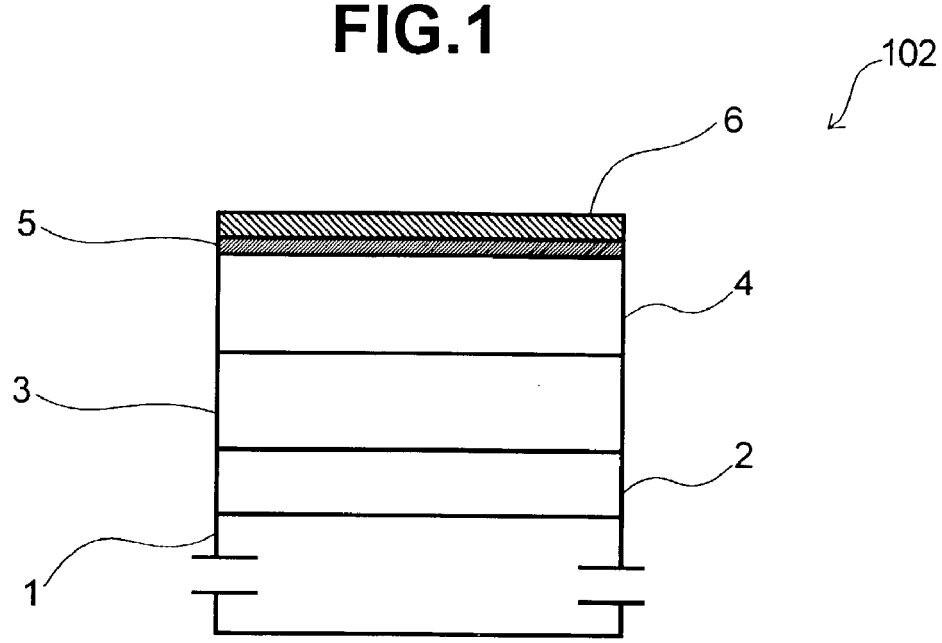
FIG. 1 is a schematic cross-sectional view of a magnetic disk features of the magnetic recording medium of one embodiment of the present invention.

When carbon ions are accelerated and injected, the ions penetrate into the film and receive high internal pressure, and elaborate tetrahedral structure with low free energy loss grows. However, excessive ion injection energy is converted to heat, and this leads to the growth of thermally stable graphite-like trigonal structure.

The cathodic arc deposition method utilizing arc discharge uses a graphite cathode, and carbon ions can be derived with energy of 50 to 70 eV. This is suitable for the formation of a hard and elaborate carbon film (tetrahedral carbon film). In particular, a filtered cathodic arc method ("FCA method") gives superb effect to remove microparticles generated at the arc source, and particles reaching the substrate by vapor deposition method can be extensively reduced. As used herein, the teens "FCA method" and "cathodic arc deposition method" are used interchangeably.

In general, in the tetrahedral amorphous carbon film formed by the FCA method, bonding ratio by sp3 hybridized carbon valence electrons is high, and mass density is 2.5 $g \cdot cm^{-3}$ or more. By the plasma CVD method, it is also possible to form high-density hydrogenated carbon film if the ion energy is controlled by electron cyclotron resonance using acetylene as the reactant gas, but mass density can be increased only up to 2.4 $g \cdot cm^{-3}$. Detailed description of the carbon film formed using the FCA method is disclosed in the following articles, "Density, sp3 Fraction, and Cross-Sectional Structure of Amorphous Carbon Films Determined by X-Ray Reflectivity and Electron Energy-Loss Spectroscopy" by Ferrari et al.; (Physical Review B, 62 (2000), pp.11089–11103), which is incorporated by reference.

The velocity of the carbon ions from the arc plasma source was directly measured to be $3 \times 10^4$ m/s, equivalent to the energy of 56.25 eV, by G. Y. Yushkov et al. Since the potential of 5.13 eV is expected on the floating substrate at the electron temperature of 2 eV, the incident ions should reach the substrate with the energy of 61.4 eV. The detailed description regarding the incident carbon ion energy is given in, "Ion Velocities in Vacuum Arc Plasmas," by G. Y. Yushkov et al. (Journal of Applied Physics, 88 (2000), pp. 5618–5622.) When carbon ions are injected to tetrahedral amorphous carbon film at energy of about 60 eV, the ions penetrate into a depth about 0.4 nm into the surface, which corresponds to about two atomic layers. In the initial stage of film formation, the ions are injected to the metal such as Co with higher mass number and energy exchange occurs less easily, and ions are driven into a depth of up to about 0.65 nm in the metal magnetic film. As a result, a mixed region is formed in thickness of 0.65 nm on the surface of the recording magnetic layer, and this is not desirable because magnetic characteristics are changed.

Also, in recent years, with the increase of the use of magnetic disk device with large capacity, the flying height process of the magnetic head has rapidly propagated. The floating amount is decreased already to 30 nm or lower. In association with this trend, there are now increasing demands on the higher wear resistance of the magnetic disk. Also, with the progress in the use of the devices with larger capacity, the higher data processing speed is now demanded. In particular in RAID system, there are demands of the development of the disk device with disk rotating speed of 10,000 rpm or more for high-speed data transfer.

In general, in order to maintain the reliability of the magnetic device, a lubricating film is formed together with a carbon protective film on the surface of the magnetic disk. As the lubricating film, fluoro-polyether, i.e., a chemically stable organic compound of fluorine type, is widely used. For instance, lubricants manufactured by Ausimont Co., Ltd. with trade name of Fomblin AM2001, Fomblin Z-DOL, Fomblin Z-DOL-TX, Fomblin Z TETRAOL, etc., or lubricants manufactured by Daikin Industries, Ltd. with trade name of Demnan SA, Demnan SP, etc. are now commercially marketed and have been used as the lubricants for disk.

The protective film and the lubricant preferably should be closely attached in order to maintain the lubricant on the surface of the magnetic disk for long time. However, the disk is rotated at high speed when the device is in operation. As a result, rotary splashing occurs due to air shear caused by the airflow along the surface of the disk generated by the rotation of the disk or due to centrifugal force directly applied on the lubricant, and the amount of the lubricant on the surface of the disk is gradually reduced. Also, it is known that the lubricant may be simply evaporated and splashed into the atmosphere of the device.

The application of a tetrahedral amorphous carbon protective film based on the FCA method to the protective film of the magnetic recording medium is discussed in: J. Robertson: "Ultra-thin carbon overcoats for magnetic storage technology" in Proceedings of the Symposium on 'Interface Technology towards 100 Gbit/in2', TRIB-Vol.9, 100 Gbit/in2, ASME 1999), which is incorporated by reference. However, there are concerns about the decrease of reliability due to the decrease of lubricant during the operation of the magnetic disk device caused by the deterioration of close adhesion between the protective film having the tetrahedral amorphous carbon structure and the lubricant. As one of the means to solve this problem, it is proposed to form a carbon protective film containing carbon with superior sp2 bonding by magnetron sputtering on the surface of the tetrahedral amorphous carbon protective film and to improve the close adhesion between the surface of the protective film and the lubricant (JP-A-2001-63717).

However, with rapid propagation of high-density hard disk device, spacing between the magnetic recording medium and the magnetic recording head is becoming increasingly narrower. In this respect, it is essential to provide a thinner carbon protective film in order to protect the magnetic recording medium. If the total film thickness of the protective film on the magnetic recording medium is 3 nm or less, it is difficult to laminate the carbon protective film, which contains carbon with superior sp2 bonding on the tetrahedral amorphous carbon protective film. As one of the means to solve this problem, it has been proposed to form a carbon protective film by FCA method under irradiation of nitrogen ion beam, to add nitrogen into the tetrahedral amorphous carbon protective film, and to improve close adhesion between the carbon protective film and the lubricant (JP-A-2002-32907). However, in order to form the carbon protective film by the above procedure, it is necessary to install a nitrogen ion beam irradiation apparatus together with an FCA film-forming apparatus. This process requires large-sized facilities.

When FCA method as used in the prior art is adopted, a carbon protective film of elaborate tetrahedral amorphous structure can be formed by sub-plantation of carbon ions, but the injected carbon ions form mixed regions on the boundary surface with the recording magnetic film and may change magnetic characteristics. Even when a magnetic disk having an elaborate and hard tetrahedral carbon protective film is prepared, magnetic characteristics may be deteriorated. Further, to form the protective film containing the tetrahedral amorphous carbon protective film, as described in the prior art, there are problems such as the limitation in the formation of thin film (i.e. total film thickness of the protective film is limited to 3 nm or less), or the decrease of general productivity due to the use of larger facilities.

Next, functional description will be given on the arrangement of the invention as described above. In the magnetic recording medium as described above, a multi-layer protective film is laminated on the magnetic film. Thus, even when carbon ions derived from the arc plasma source are injected at an energy of about 60 eV, the ions do not reach the recording magnetic film or do not penetrate beyond the boundary surface due to energy loss on the multi-layer protective film, and this contributes to the prevention of changes of magnetic characteristics. Specifically, it is effective for preventing the formation of mixed regions on the boundary surface between the recording magnetic film and the lowermost layer of the multi-layer protective film. The injected particle energy is transmitted in the best adequate manner when the injected particles are the same as the target particles. If a lower layer of a multi-layer protective film is a carbon film, ion-stopping power is high, and a thinner, lower protective film can be provided. Except for the uppermost layer, at least one layer may be a film, which comprises at least hydrogen, nitrogen, boron, silicon, or fluorine in addition to carbon; or a film containing silicon or its oxide, nitride, or carbide; or a nonmagnetic metal or its oxide, nitride, or carbide. For instance, when a carbon film of 2 $g/cm^3$ is deposited by sputtering and if at least one layer of the multi-layer protective film except the uppermost layer is 0.5 nm in thickness, the carbon ions injected at energy of about 60 eV are prevented from penetrating into the recording magnetic film. Even when a film comprising other atoms may be used and if adequate thickness is selected depending on number of atoms, mass number and density, the penetration of the injected carbon ions can be prevented. If at least one layer of the multi-layer protective film except the uppermost layer is 0.2 nm or more in thickness, the injected ions are decelerated. To prevent the penetration of the ions into the recording magnetic film, the lower layer preferably has two or more atomic layers. If the lower layer film is made thicker, magnetic spacing may be spread wider. On the other hand, if the uppermost layer of the multi-layer protective film is made thinner, anti-friction property of the magnetic recording medium may be deteriorated. In this respect, it is desirable to set the upper limit of the thickness of the lower layer, where the uppermost layer is provided with at a thickness of about 1 nm or more. Accordingly, if the thickness of the multi-layer protective film is set to 3 nm or less, the thickness of the lower layer should be within the range of about 0.2 to about 2 nm.

In the method for coating the lubricating film on the magnetic recording medium manufactured by the above method, a chemically stable organic compound of fluorine type, i.e. fluoro-polyether, is widely used. For instance, lubricants manufactured by Ausimont Co., Ltd. with trade name of Fomblin AM2001, Fomblin Z-DOL, Fomblin Z-DOL-TX, Fomblin Z TETRAOL, etc. or lubricants manufactured by Daikin Industries, Ltd. with trade name of Demnam SA, Demnam SP, etc. are now commercially marketed and can be used as the lubricants for disk.

As coating methods, dipping method, spin coating method, etc. may be used. In the dipping method, lifting speed is a parameter required for the setting of concentration. In the spin coating method, number of revolutions and duration of rotation are parameters required for the setting of concentration. If the concentration of the solution is the same, the higher the lifting speed is, the thinner lubricating film can be formed by the dipping method. In the spin coating method, there is much loss due to the splashing of solvent during the process to manufacture the lubricating film. In one embodiment, the dipping method is used to coat the lubricating film.

As the solvents, it is preferable to use solvents such as perfluorocarbon, fluoro-polyether, hydrofluoroether, hydrofluorocarbon, chlorine-containing hydrofluorocarbon, etc. The products commercially available include PFC-5060 (manufactured by 3M Company, Ltd.), GALDEN (manufactured by Ausimont Co., Ltd.), HFE-7100 (manufactured by 3M Company, Ltd.), Vertrel XF (manufactured by DuPont de Nemours Co.), Asahiclin AK-225 (manufactured by Asahi Glass Co., Ltd.), etc.

The applications of the magnetic recording medium of the present embodiments include external memory device (more concretely, hard disk device, flexible disk device, etc.) for electronic computers, word processors etc. It can be used for the applications in various type of devices such as internal or external memory device for navigation system, game device, handy phone, PHS, etc. and management and control system for crime prevention device in buildings, or management and control system for power generation plant.

Figure 2:
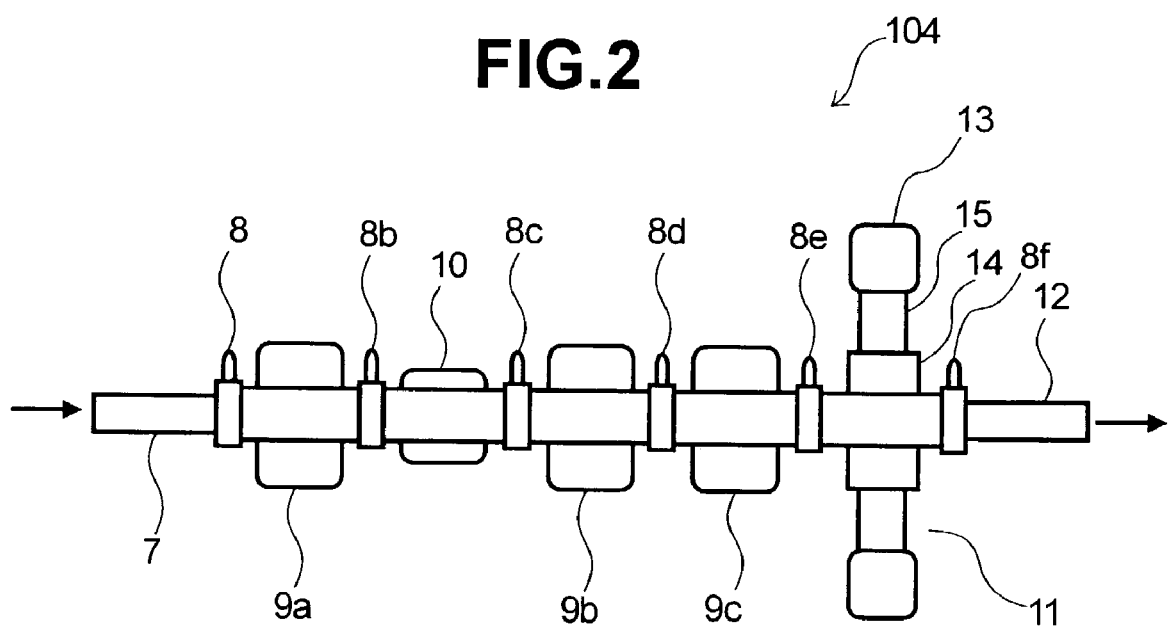
FIG. 2 is a schematic drawing of an arc ion beam deposition device shown in Examples and Comparative Examples of the present invention.
Figure 3:
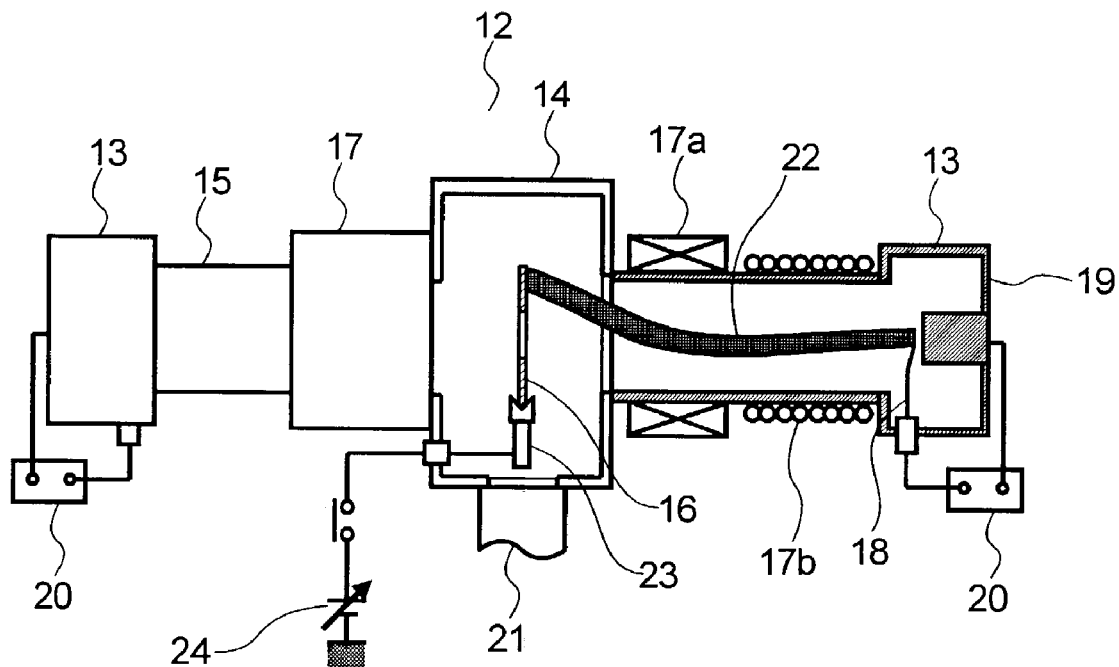
FIG. 3 is a schematic drawing of a system for manufacturing the magnetic disk provided with the arc ion beam deposition device of an embodiment of the present invention.
Figure 4:
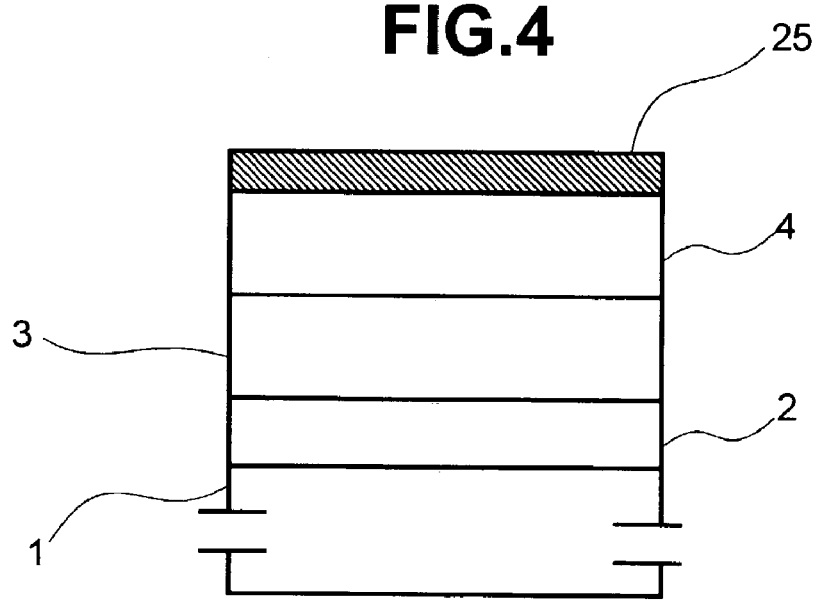
FIG. 4 is a schematic cross-sectional view of the magnetic disk shown in Comparative Example 1 of the present invention.
Figure 5:
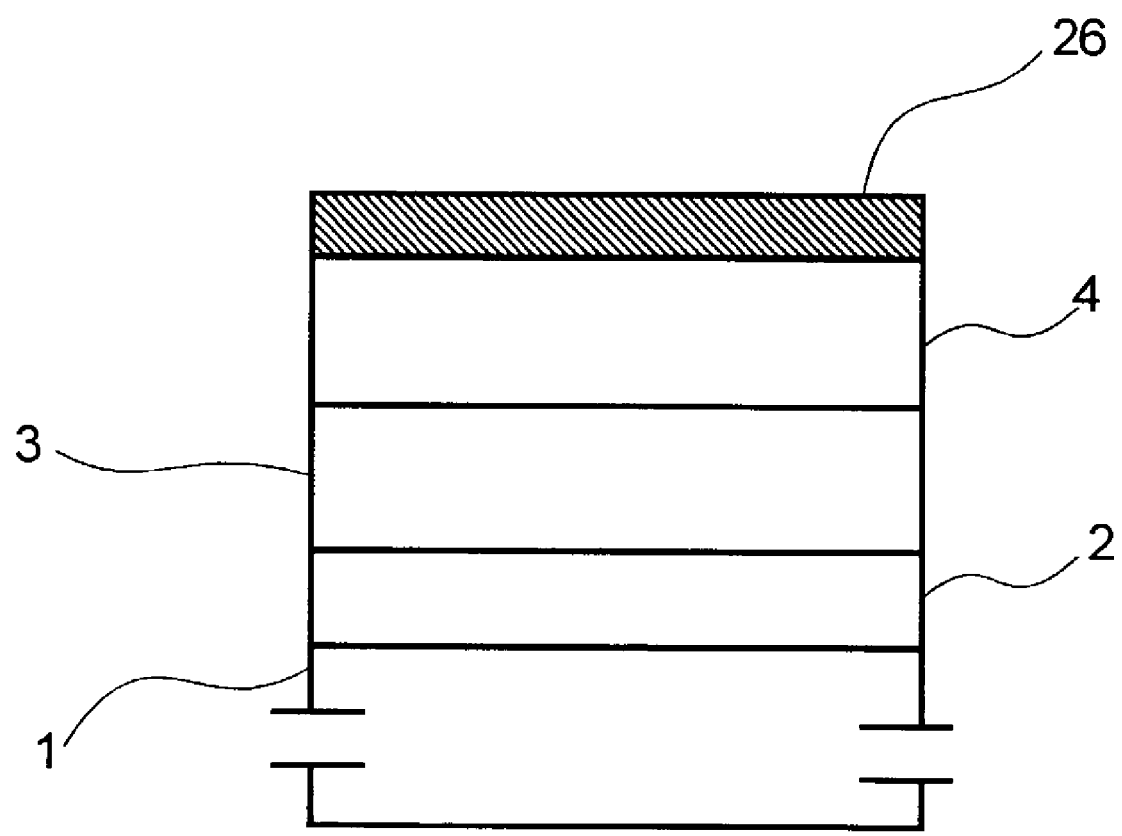
FIG. 5 is a schematic cross-sectional view of the magnetic disk shown in Comparative Example 2 of the present invention.
Figure 6:
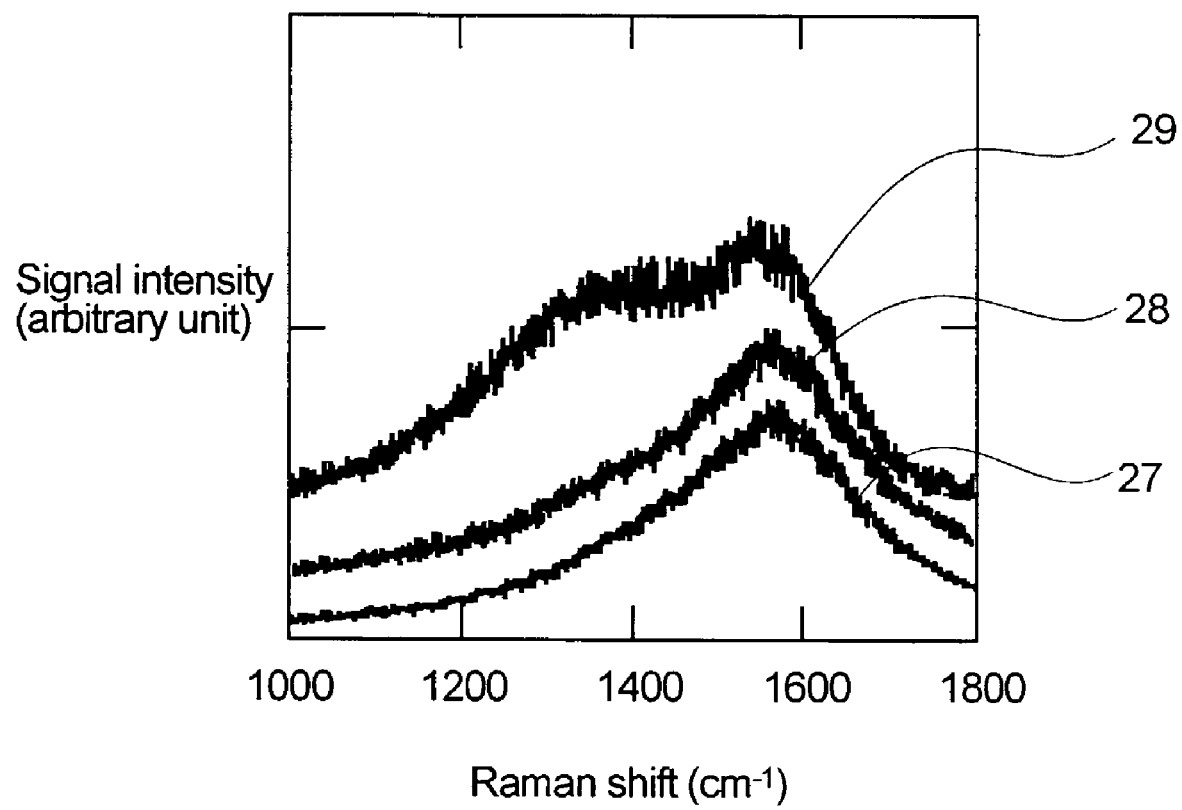
FIG. 6 is a diagram showing comparison of Raman spectra measured on the magnetic recording medium shown in Examples and Comparative Examples of the present invention.
Figure 7:
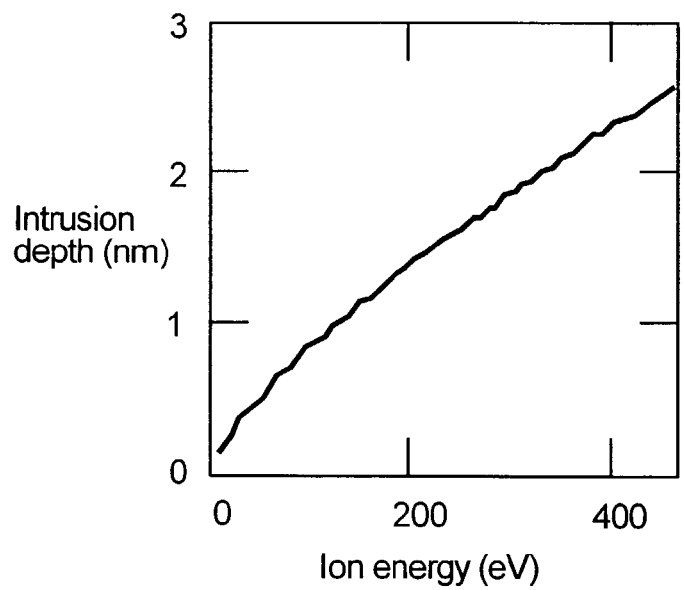
FIG. 7 is a diagram showing the relation between carbon ions entering Co film and injection energy based on calculation of nuclear stopping power according to one embodiment of the present invention.
Figure 8:
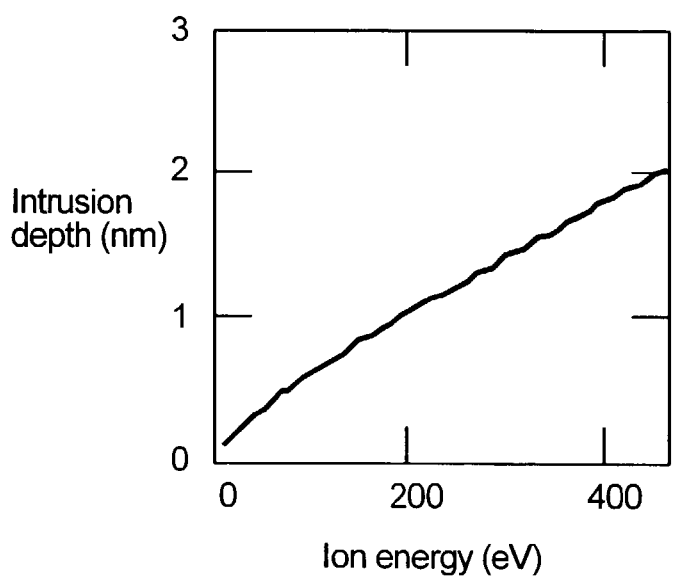
FIG. 8 is a diagram showing the relation between carbon ions entering carbon film and injection energy based on calculation of nuclear stopping power according to one embodiment of the present invention.
Figure 9:
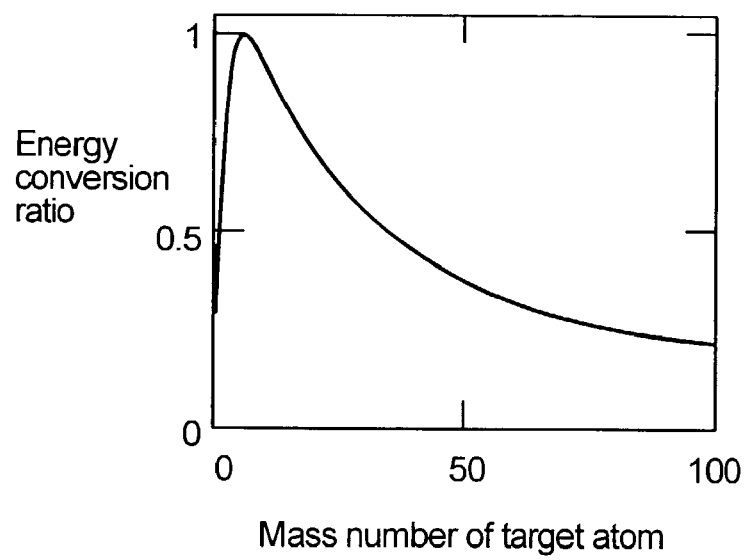
FIG. 9 is a diagram showing Raman spectrum of a specimen in an embodiment of the present invention.
Figure 10:
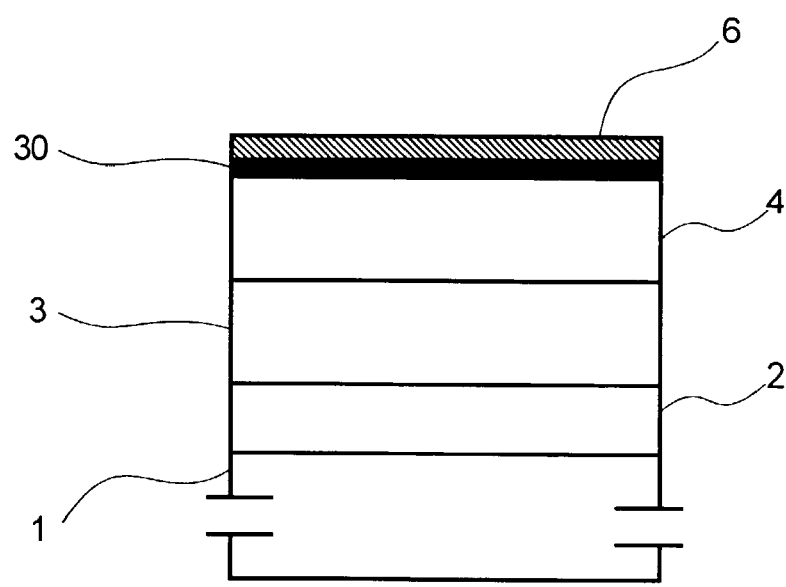
FIG. 10 is a schematic cross-sectional view of a magnetic disk of Example 2 of the present invention.
Figure 11:
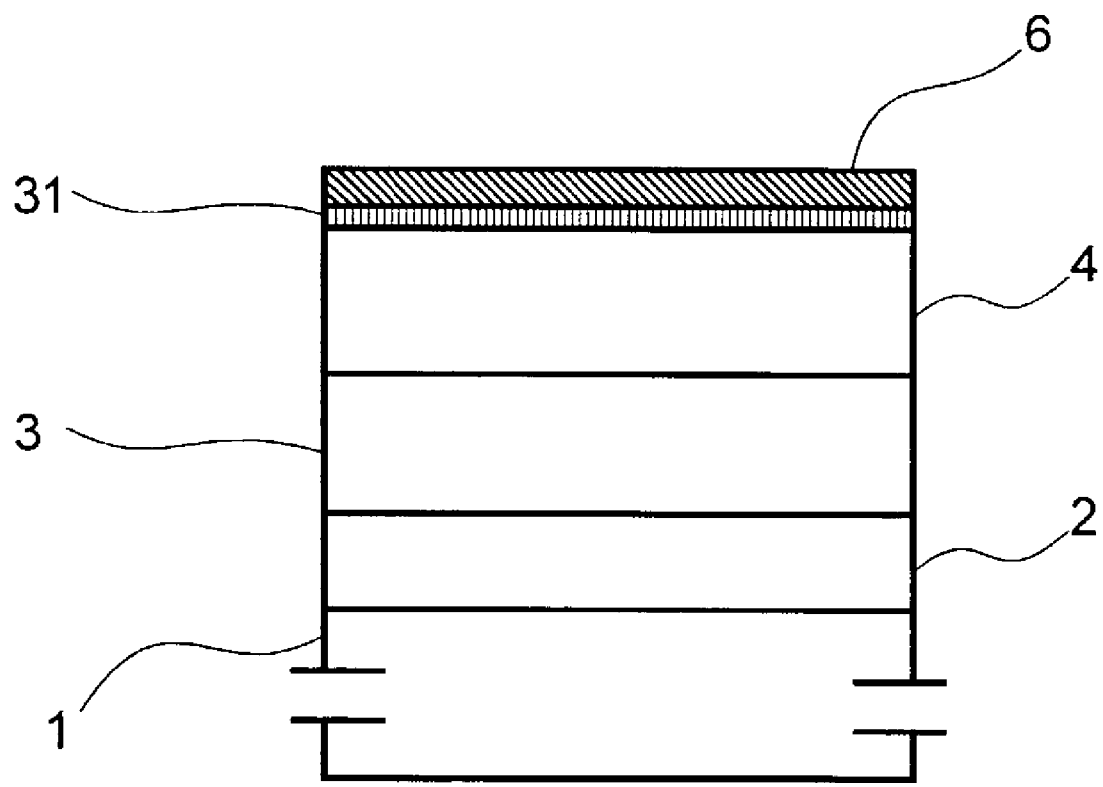
FIG. 11 is a schematic cross-sectional view of a magnetic disk of Example 3 of the present invention.
Figure 12:
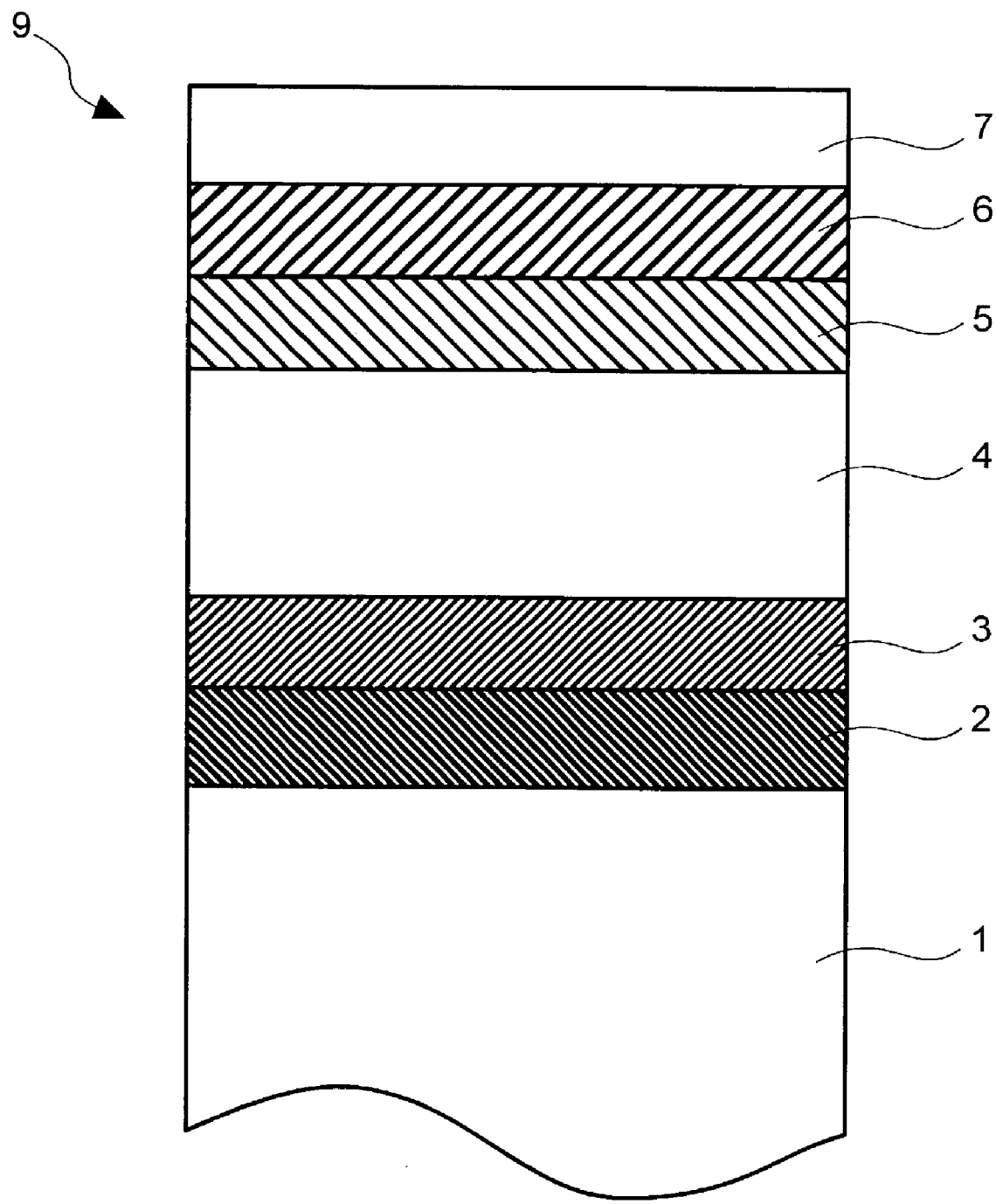
FIG. 12 is a cross-sectional view of a magnetic disk shown in Example 4 of the present invention.
Figure 13:
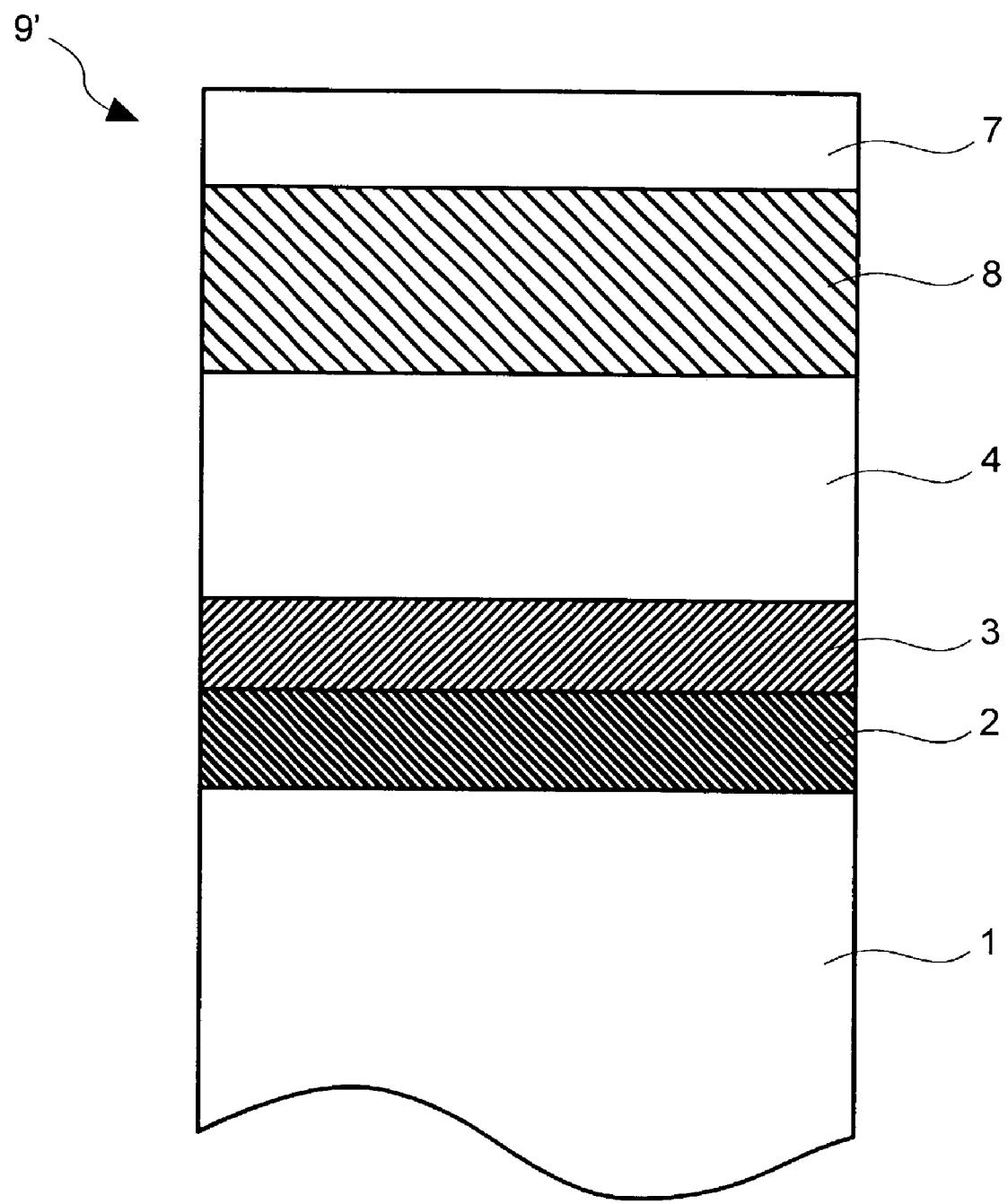
FIG. 13 of a cross-sectional view of a magnetic disk shown in each of Comparative Examples 2, 3 and 4 of the present invention.
Figure 14:
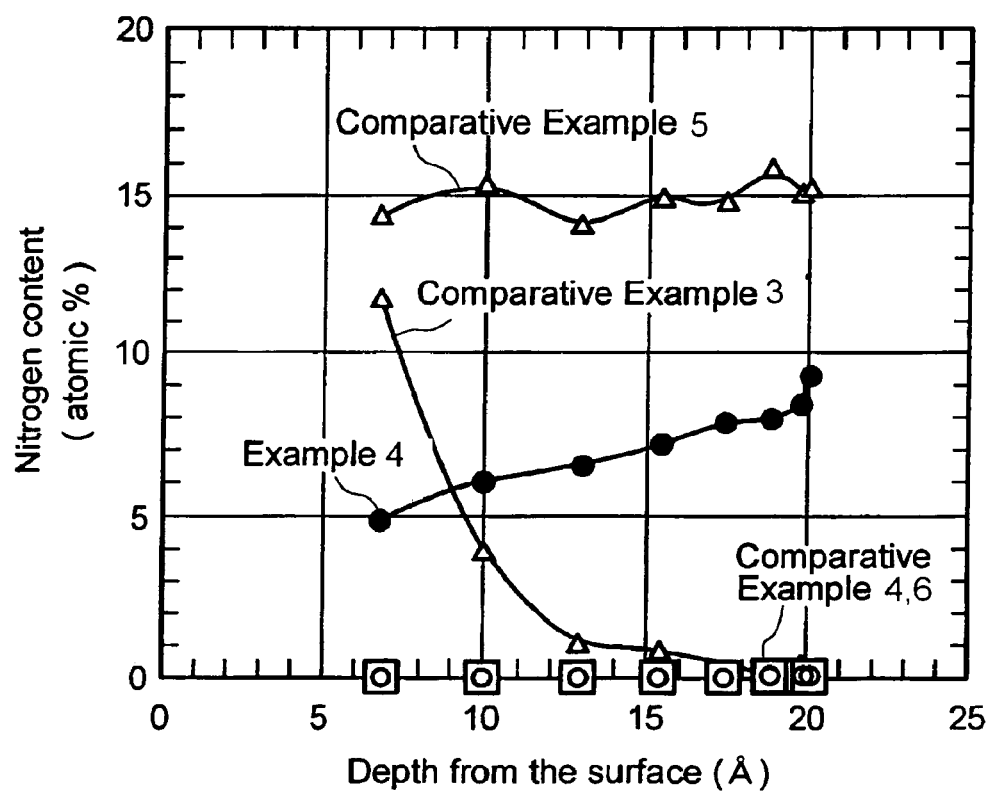
FIG. 14 is a diagram to compare information of depth of nitrogen content in the protective film by ESCA as determined in the magnetic recording medium in each of Examples and Comparative Examples of the present invention.
Figure 15:
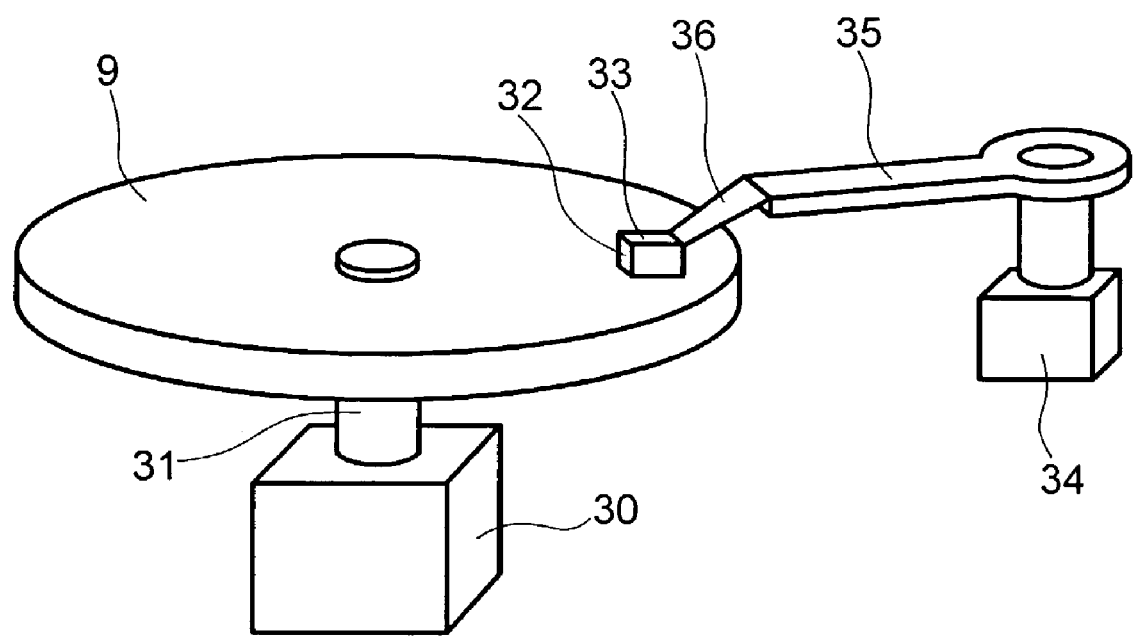
FIG. 15 is a schematic drawing of a magnetic disk device equipped with a magnetic disk according to the Example of the present invention.

FIG. 1 is a schematic cross-sectional view of a magnetic disk 102 according to one embodiment of the present invention. FIG. 2 is a schematic drawing of a manufacturing system 104 equipped with a cathodic arc deposition system according an embodiment of the present invention. FIG. 3 is a drawing to show an exemplary arrangement of a cathodic deposition system of one embodiment of the present invention. FIG. 4 is a schematic cross-sectional view of a magnetic recording disk shown in Comparative Example 1. FIG. 5 is a schematic cross-sectional view of a magnetic disk of Comparative Example 2. FIG. 6 is a diagram showing comparison of Raman spectra measured by the magnetic recording medium of Examples and Comparative Examples. FIG. 7 is a diagram showing the relation between carbon ions entering Co film and injection energy based on calculation of nuclear stopping power according to one embodiment of the present invention. FIG. 8 is a diagram showing the relation between carbon ions entering carbon film and injection energy based on calculation of nuclear stopping power according to one embodiment of the present invention. FIG. 9 is a diagram showing correlation of energy transfer between injected atoms and target atoms according to one embodiment of the present invention. FIG. 10 is a schematic cross-sectional view of a magnetic disk of Example 2. FIG. 11 is a schematic cross-sectional view of a magnetic disk of Example 3. FIG. 12 is a cross-sectional view of the magnetic disk shown in Example 4. FIG. 13 represents cross-sectional views of magnetic disks shown in Comparative Examples 2, 3 and 4. FIG. 14 is a diagram for comparison of the information of depth of nitrogen content in the protective film by ESCA measured in the magnetic recording medium of Examples and Comparative Examples. FIG. 15 is a schematic drawing of the magnetic disk device equipped with the magnetic disk of the Examples.

Table 1 shows comparison of magnetic characteristics of the magnetic disk shown in Example 1 and Comparative Examples 1 and 2. Table 2 shows comparison of magnetic characteristics of the magnetic disk shown in Examples 2 and 3 and Comparative Example 1. Table 3 shows thickness of the lubricating film after the lubricant has been coated, thickness of the bonding film after the solvent is washed off, and bond ratio in Example 4 and Comparative Example 3, 4, 5 and 6. Table 4 shows the comparison of the highest friction coefficient obtained in the evaluation of reliability in Comparative Examples 3, 4, 5 and 6 and by CSS test. Table 5 shows comparison of magnetic characteristics of the magnetic disk shown in Examples 4 and 5 and Comparative Example 1.

EXAMPLE 1

A magnetic disk having an arrangement shown in FIG. 1 was prepared using a system to manufacture magnetic disk shown in FIG. 2 equipped with a cathodic arc deposition system of FIG. 3. In the magnetic disk of this Example, a NiCr precoat film 2 of 10 nm in thickness, a Cr alloy underlying film 3 of 20 nm in thickness, a CoCr alloy recording magnetic film 4 of 25 nm in thickness, and a carbon thin-film of 0.5 nm in thickness serving as a lower protective film 5 are sequentially formed or laminated by magnetron sputtering on a disk-like base material 1 made of glass. Further, an upper protective film 6 is laminated in thickness of 1.5 nm by cathodic arc deposition. Magnetic characteristics and Raman spectrum of this magnetic disk were measured. The results of the measurement of Raman spectrum in the present Example are represented by a graph 28 shown in FIG. 6. The magnetic disk manufacturing system 104 of FIG. 2 is provided with magnetron sputtering electrodes 9a–9c and a cathodic arc deposition system 11 of FIG. 3, and all layers including the lower protective film 5, except for the upper protective film 6 are formed by magnetron sputtering in this embodiment.

The cathodic arc deposition system comprises an arc plasma source 13, a film-forming chamber 14, a substrate 16 placed in a duct 15 and the film-forming chamber 14, and an electromagnetic deflector 17 arranged at a junction between the duct 15 and the film-forming chamber 14. This is used for film formation of the upper protective film 6. In this system, a movable anode 18 in the arc plasma source 13 is brought into contact with a cathode 19 of a graphite rod, and arc discharge is generated. Carbon ions shoot out from the arc plasma source 13 enter the substrate 16 in the chamber 14 via the duct 15, and a carbon film is formed. The substrate 16 is held by a holder 23, which is electrically floating. Bias voltage may be applied to the substrate 16 by a power source 24. In the present Examples, bias voltage is not applied, and the substrate is provided with a floating potential during operation. The ions may be provided with implantation energy of about 50 eV to about 100 eV, preferably in a vacuum chamber.

In this Example, the upper protective film 6 on the uppermost layer can be made as a carbon film with mass density of 2.5 g·cm$^{-3}$ or more, and a protective film having higher protective property (corrosion-resistant property and wear resistance) than the carbon film formed by plasma CVD method can be produced. The protective film 6 comprises about 80 percent or more tetrahedral carbon structure, preferably 90 percent or more, or more preferably 98 percent or more. The lower protective film 5 and the upper protective film 6 in this Example are both carbon films having carbon. Because mass density varies according to the difference of the forming method, these can be identified by the layers based on the difference of mass density.

COMPARATIVE EXAMPLE 1

By the same procedure as in Example 1, only a carbon nitride of 2 nm in thickness was formed directly on a recording magnetic film 4 as a protective film 25 by magnetron sputtering using a graphite cathode 19 in an atmosphere of 1.3 Pa containing argon gas mixed with nitrogen gas by 10%, and magnetic characteristics and Raman spectrum of the protective film were determined. The results of the measurement of Raman spectrum in this Comparative Example are represented by the graph 29 shown in FIG. 6. FIG. 4 is a schematic cross-sectional view of a magnetic disk of this Comparative Example.

COMPARATIVE EXAMPLE 2

By the same procedure as in Example 1, only a carbon film 26 of 2 nm in thickness was directly laminated on a recording magnetic film 4 by cathodic arc deposition without forming the protective film in multiple layers, and a magnetic disk with cross-section as shown in FIG. 5 was prepared. Then, magnetic characteristics and Raman spectrum were measured. The results of the measurement of Raman spectrum in this Comparative Example are represented by the graph 27 shown in FIG. 6.

TABLE 1

|  | Rectangular ratio S* | Mr · δ(Gμm) | Coercive force (×10³ Oe) |
|---|---|---|---|
| Example 1 | 0.65 | 33.6 | 4.53 |
| Comparative Example 1 | 0.66 | 33.7 | 4.55 |
| Comparative Example 2 | 0.62 | 31.9 | 4.72 |

As shown in Table 1, magnetic characteristics of each of the magnetic disks of Example 1 and Comparative Examples 1 and 2 were compared, and the magnetic characteristics of Example 1 were almost the same as those of Comparative Example 1. In Comparative Example 2, in which the protective films were not formed in multiple layers and only a carbon film 24 was directly formed on the recording magnetic film 4 by cathodic arc deposition, rectangular ratio S* and Mr·δ, i.e. product of remnant magnetization Mr and magnetic layer thickness δ, decreased by 3.5% and 5% respectively, while coercive force Hc increased by 4%. On the other hand, in the comparison of Raman spectrum shown in FIG. 6, Raman spectrum derived from carbon film on the recording magnetic film 4 showed a form specific to the so-called tetrahedral carbon structure, and these were almost similar to each other in Example 1 (graph 28) and Comparative Example 2 (graph 27). In Comparative Example 1 (graph 29), however, peak intensity of the so-called D band near 1400 cm$^{-1}$ was high, and this was a form specific to the sputter-deposited carbon film. When mass density was calculated according to the results of measurement by high resolution Rutherford backscattering analytical method, it was 2.8 g·cm$^{-3}$.

Thus, it is evident that, if the upper protective film 6 is formed by injection of carbon ions from the arc plasma source 13, magnetic characteristics show no change as in Example 1 and the lower protective film 5 was effective in stopping the penetration of carbon ions entering the recording magnetic film 4. Even when the lower layer protective film was provided in thickness of 0.5 nm, it gave no substantial influence on chemical structure of the carbon film laminated on the recording magnetic film 4. In general, the energy of the ions derived from the arc plasma source 13 is primarily determined by the material of the target. If it is assumed that about 60 eV of energy of a single carbon ion released from the graphite cathode 19 enters Co film and nuclear stopping power is calculated, the depth of penetration of Co film is 0.62 nm (FIG. 7), while the depth of penetration into the carbon film is 0.4 nm (FIG. 8). Therefore, if a carbon film of 0.5 nm in thickness is used as the lower protective film 5, carbon ions neither penetrate the lower protective film 5 nor reach the recording magnetic film, and the ions do not intrude. In the calculation of nuclear stopping power, it is assumed that the atoms entering the film drive into the film until energy is lost by Coulomb's force with Thomas Fermi potential between the injected atoms and the target atoms. FIG. 7 and FIG. 8 each represents the relation between the carbon ions entering the Co film and the carbon film and injection energy based on the calculation of nuclear stopping power.

Also, the energy converted from the injected atoms to the target atoms in a single collision is represented by energy transfer function. Energy converted by collision with carbon atoms is in the relation shown in FIG. 9. In the collision with Co atoms, which have higher mass number than the injected carbon atoms, energy conversion is low, and carbon ions intrude deeper. Normally, to quantitatively determine the thickness of the mixing layer, analysis of depth by Auger electron spectroscopy is used. Depth of emission of secondary electrons estimated from mean free path due to inelastic collision of primary electrons is 1.5 to 2 nm. If the mixed layer is thinner than this, it is not easy to quantitatively determine. On the relation between secondary electron emission depth and primary electron energy by Auger electron spectroscopy, detailed description is given in "Fundamentals and Application of Surface Analysis" by T. Yamashina and S. Fukuda (Tokyo University Press; 1991, pp.56–64), which is incorporated by reference. In this respect, if it is assumed that the changes in magnetic characteristics (Mr·δ) are caused by the decrease of thickness of the recording magnetic film and the thickness of the mixed layer is estimated, it is 0.6 nm, and this approximately agrees with the depth of penetration of 0.62 nm based on the calculation of nuclear stopping power shown in FIG. 7.

Specifically, the lower protective film 5 given in Example 1 is effective for stopping the injection of carbon ions resulting from cathodic arc deposition to the recording magnetic film 4, as indicated by the calculation of nuclear stopping power. By providing this lower protective film 5, it is possible, without changing the magnetic characteristics, to offer a magnetic recording medium, which has a protective film having high hardness, high corrosion-resistant property and high wear resistance. Naturally, if negative bias voltage is applied on the substrate in Example 1, ions are accelerated by the applied bias voltage, and penetration of carbon ions entering the recording magnetic film 4 may not be prevented without increasing the thickness of the lower protective film. The application of bias voltage on the substrate is effective for controlling the energy of ions. If ion injection energy is in excess, it is converted to heat and it leads to the growth of graphite-like trigonal structure, which is thermally stable.

For instance, energy of a single carbon ion released from the graphite cathode 19 and entering the substrate 16 is about 60 eV when no bias power is applied to the substrate. When this was accelerated by negative voltage and was applied to the substrate and a carbon film was formed, relative intensity of the so-called D band in Raman spectrum of the carbon film was rapidly increased by bias voltage of −400 V or more. That is, when injection energy of the carbon ions was accelerated up to 460 eV, growth of tetrahedral carbon structure was prevented, and the strength of film structure was deteriorated. From FIG. 8, penetration depth of carbon ions with energy of 460 eV is 2 nm. Therefore, the upper limit of the thickness of the lower protective film prepared to cope with negative bias voltage of 400 V or less on the substrate is 2 nm in one implementation.

In Example 1, the recording magnetic film comprises CoCr alloy having longitudinal magnetic anisotropy using Cr alloy as the underlying film. However, it is needless to say that the lower protective film is effective in preventing the injection of carbon ions into the recording magnetic film 4 in the film-forming process by cathodic arc deposition as shown in Example 1 even when other materials are used, i.e., when a Co or CoNi alloy having perpendicular magnetic anisotropy or a perpendicular magnetic film having CoCr alloy formed on a soft magnetic material such as Permalloy film and an artificial lattice multi-layer film comprising a magnetic layer of Co or the like and a nonmagnetic layer such as Pd are alternately laminated and are used. For instance, a carbon film is formed as the lower protective film by magnetron sputtering method on a Co—Cr perpendicular magnetic anisotropy layer of 200 nm in thickness lined with ion nickel soft magnetic underlying layer of 200 nm in thickness, and a carbon film serving as the upper layer protective film is formed by cathodic arc deposition. Compared with the case where the carbon protective film was directly formed by cathodic arc deposition on a Co—Cr perpendicular magnetic anisotropy layer, coercive force measured in a direction perpendicular to the surface of the perpendicular magnetic disk film surface increased by 5%. That is, even when the perpendicular magnetic disk was used, if the protective films were not provided in two layers, carbon atoms intruded into the Co—Cr perpendicular magnetic anisotropy layer through injection of carbon ions by cathodic arc deposition, and magnetic characteristics were changed.

EXAMPLE 2

As the lower protective film 5 in Example 1, a magnetic disk having a carbon nitride film 30 of 0.5 nm in thickness was prepared to have a cross-section as shown in FIG. 10, and magnetic characteristics were measured. This carbon nitride film 30 was formed by magnetron sputtering using a graphite cathode in an atmosphere of 1.3 Pa containing argon gas mixed with nitrogen gas by 10%. The upper layer protective film 6 was formed by the same cathodic arc deposition method as in Example 1.

EXAMPLE 3

As the lower layer protective film 5 in Example 1, a magnetic disk having a silicon-containing carbon film 31 of 0.5 nm in thickness was prepared to have a cross-section shown in FIG. 11, and magnetic characteristics were measured. This silicon-containing carbon film 31 was formed by magnetron sputtering using a graphite target containing silicon by 20 atom %. The upper layer protective film 6 was formed by the same cathodic arc deposition method as in Example 1.

TABLE 2

|  | Rectangular ratio S* | Mr · δ(Gμm) | Coercive force (×10³ Oe) |
| --- | --- | --- | --- |
| Example 2 | 0.65 | 33.6 | 4.58 |
| Example 3 | 0.67 | 33.8 | 4.54 |
| Comparative Example 1 | 0.66 | 33.7 | 4.55 |

As a result, magnetic characteristics of the magnetic disks shown in Examples 2 and 3 approximately agreed with the results of Comparative Example 1 as shown in Table 2, and it was found that the magnetic characteristics were the same as the magnetic characteristics obtained by cathodic arc deposition method shown in Example 1. This reveals that the carbon nitride film and the silicon-containing carbon film as described above are effective as the lower layer protective film in preventing the penetration of carbon ions to the recording magnetic film 4 in the film-forming process by cathodic arc deposition.

Other materials, e.g., a thin film material containing at least hydrogen, boron, silicon, or fluorine in addition to carbon or a thin film material comprising a nonmagnetic metal or its oxide, nitride, or carbide may be used as the lower layer protective film. As it is evident from energy transfer function, the closer the mass number is to that of carbon atoms, the higher the energy converted by collision with carbon atoms. Also, the penetration is shallower and thinner, and this is more advantageous. By the injection of carbon ions, the elements inside the lower protective film are also diffused into the upper protective film. In this respect, a material having less influence on physical property and structure of the upper protective film by injection of carbon ions should be selected as the lower protective film or, at least it should be selected from the materials, which do not deteriorate performance characteristics of the protective film.

EXAMPLE 4

A magnetic disk with the arrangement shown in FIG. 12 was prepared by using the magnetic disk manufacturing system 101 shown in FIG. 2 equipped with the cathodic arc vapor deposition device 12 of FIG. 3. In the magnetic disk of this Example, NiCr pre-coating film 2 of 10 nm in thickness, a Cr alloy primer layer film 3 of 20 nm in thickness, and a magnetic recording film 4 of CoCr alloy of 25 nm in thickness were sequentially laminated by magnetron sputtering on a disk-like substrate 1 made of glass. On the magnetic recording film 4 as described above, a nitrogen-containing carbon protective film of 1.0 nm in thickness, serving as a first protective film 5, was formed by magnetron sputtering method in an atmosphere of 1.3 Pa on the magnetic recording medium 4. A process gas used includes about 90% argon and about 10% nitrogen. In one implementation, the process gas includes about 6% to about 20% nitrogen. Then, a tetrahedral carbon protective film of 1.0 nm in thickness, serving as a second protective film 6, was formed by FCA method, thus forming a multi-layer carbon protective film. Then, the information of depth of nitrogen content was determined by ESCA (electron spectroscopy for chemical analysis).

COMPARATIVE EXAMPLE 3

On a disk where the films have been sequentially laminated up to the magnetic recording film of the Example, a first protective film of 1.0 nm in thickness was formed by FCA method. A nitrogen-containing carbon protective film of 1.0 nm in thickness, serving as a second protective film, was formed on the first protective film by magnetron sputtering method in an atmosphere containing argon gas and mixed with nitrogen gas by 10%, and information of the depth of nitrogen content in the protective film was determined by ESCA.

COMPARATIVE EXAMPLE 4

On a disk where the films have been sequentially laminated up to the magnetic recording film of the Example, only a carbon protective film of 2.0 nm in thickness was directly formed on the magnetic recording film 4 as a protective film 8 by FCA method. The information of depth of nitrogen content in the protective film was determined by ESCA. FIG. 13 is a cross-sectional view of the magnetic disk of the present Comparative Example.

COMPARATIVE EXAMPLE 5

On a disk where films have been sequentially laminated up to the magnetic recording film of the Example, only a nitrogen-containing protective film of 2 nm in thickness was directly formed on the magnetic recording film 4 as a protective film 8 by magnetron sputtering method in an atmosphere of 1.3 Pa containing argon gas and mixed with nitrogen gas by 10%. The depth of nitrogen content in the protective film was determined by ESCA.

COMPARATIVE EXAMPLE 6

On a disk where films have been sequentially laminated up to the magnetic recording film of the Example, only a carbon protective film of 2 nm in thickness was directly formed on the magnetic recording film 4 by ion beam deposition method under the conditions of anode voltage 60 V, substrate bias voltage of −120 V, ethylene flow rate of 50 sccm, and pressure of 0.5 Pa. Then, the information of depth of nitrogen content in the protective film was determined by ESCA.

FIG. 14 shows the depths of nitrogen contents in the protective films determined by ESCA in each of the magnetic disks shown in Example 4, and Comparative Examples 3, 4, 5 and 6. As it is evident from Comparative Example 4, when the protective film is formed by FCA method, nitrogen is not contained in the protective film. In contrast, in Example 4, a mixed region comprising the first protective film 5, serving as the nitrogen-containing carbon protective film, and the second protective film 6 by FCA method is formed. As a result, nitrogen is contained in the second protective film 6. Also, the nitrogen content has a gradient, and the nitrogen content is gradually decreased from the magnetic film of the carbon protective film toward the surface. In Comparative Example 3, the order of the formation of the multi-layer protective films is inverted. The first layer film is the carbon film prepared by FCA method, and the second layer film is the nitrogen-containing carbon protective film prepared by magnetron sputtering method. When the second layer film is formed by magnetron sputtering method, energy of carbon ions is low and ions do not penetrate into the first layer film, and nitrogen is not contained in the first layer film. In Comparative Example 5, all of the protective films are formed by the nitrogen-containing carbon protective films prepared by magnetron sputtering method, and the nitrogen content is the same in all regions in the film. In Comparative Examples 4 and 6, nitrogen is not contained in the protective film.

It is known that close adhesion of the protective film with the lubricant depends much upon the nitrogen content in the protective film. Thus, comparison was made below on the interaction between the protective film and the lubricant in each of the magnetic disks of Example 4, Comparative Examples 3, 4, 5 and 6.

On the magnetic disk obtained in the above Example, a film of a lubricant with trade name of Fomblin Z-Dol was formed by the dipping method, and a magnetic recording medium was prepared. The thickness of the lubricating film was determined from the ratio of the peak strength derived from C—C of Cls peak to the peak strength derived from C—F using ESCA. To evaluate close adhesion of the protective film with the lubricant, the disk was washed by a coating solvent not containing the lubricant after the lubricating film was coated by the dipping method, and the thickness of the remaining lubricating film was evaluated. It was evident that, the thicker the remaining lubricating film was, the higher the close adhesion between the protective film and the lubricant, and it cannot be washed off by the solvent. In general, this remaining lubricating Film is called as a bonding layer where the protective film is closely adhered to the lubricant, and the close adhesion of the protective film with the lubricant can be evaluated by the thickness of the bonding layer. Also, in order to quantitatively determine the close adhesion between the protective film and the lubricant, a bonding ratio is generally used, which is given by the ratio of the thickness of the bonding layer to the initial thickness of the lubricating film. In Table 3, thickness of the lubricating film after coating of lubricant, thickness of the bonding layer after solvent wash-off and the bonding ratio are shown.

TABLE 3

|  | Initial lubricating film thickness (Å) | Bonding film thickness (Å) | Bonding ratio (%) |
| --- | --- | --- | --- |
| Example 4 | 2.17 | 9.6 | 44.2 |
| Comparative Example 3A | 2.16 | 4.3 | 19.7 |
| Comparative Example 4A | 1.92 | 3.3 | 1.70 |
| Comparative Example 5A | 23.7 | 5.8 | 2.45 |
| Comparative Example 6A | 18.0 | 1.9 | 10.3 |

COMPARATIVE EXAMPLE 3A

Similarly to Example 4, a lubricating film of the product with trade name of Fomblin Z-DOL was formed on the magnetic disk obtained in Comparative Example 3 by the dipping method, and a magnetic recording medium was prepared. Table 3 shows thickness of the lubricating film after coating of the lubricant, thickness of the bonding after solvent wash-off, and the bonding ratio.

COMPARATIVE EXAMPLE 4A

Similarly to Example 4, a lubricating film with trade name of Fomblin Z-DOL was formed on the magnetic disk obtained in . comparable example 4 by the dipping method, and a magnetic recording medium was prepared. Table 3 shows thickness of the lubricating film after coating of the lubricant, thickness of the bonding after solvent wash-off, and the bonding ratio.

COMPARATIVE EXAMPLE 5A

Similarly to Example 4, a lubricating film with trade name of Fomblin Z-DOL was formed on the magnetic disk obtained in Comparative Example 5 by the dipping method, and a magnetic recording medium was prepared. Table 3 shows thickness of the lubricating film alter coating of the lubricant, thickness of the bonding after solvent wash-off, and the bonding ratio.

COMPARATIVE EXAMPLE 6A

Similarly to Example 4, a lubricating film with trade name of Fomblin Z-DOL was formed on the magnetic disk obtained in Comparative Example 6 by the dipping method, and a magnetic recording medium was prepared. Table 3 shows thickness of the lubricating film after coating of the lubricant, thickness of the bonding after solvent wash-off, and the bonding ratio.

The bonding ratio in Example 4 is higher than that of Comparative Examples 3A, 4A, 5A, and 6A, and this shows that close adhesion between the protective film and the lubricant is higher. The change of the bonding ratio exhibits structural change of the lubricating film, which forms the uppermost surface of the magnetic recording medium. This means that the reliability is changed during long-term operation of the magnetic disk device. On the magnetic recording medium prepared in the Example, CSS test was performed by using a magnetic head made of $Al_2O_3$—TiC covered with carbon film. The testing conditions were set to: head load 3 gf, temperature 25° C., humidity 40%, measured radius 20 mm, and number of revolutions of the disk 15,000 rpm. To evaluate the reliability, the magnetic recording medium after coating of the lubricant was used. To evaluate the close adhesion between the protective film and the lubricant, the ratio of the thickness of initial lubricating film to the thickness of the remaining film after operation of 10, 100 and 1000 hours was determined. To evaluate the reliability, the maximum friction coefficients after operation of 10, 100 and 1000 hours were compared. The results are summarized in Table 4.

TABLE 4

| | Results after evaluation | | | | | |
|---|---|---|---|---|---|---|
| | Maximum friction coefficient | | | Ratio to thickness of The remaining film | | |
| | After 10 hours | After 100 hours | After 1000 hours | After 10 hours | After 100 hours | After 1000 hours |
| Example | 0.6 | 0.5 | 0.6 | 98.3% | 97.5% | 95.2% |
| Comparative Example 3A | 0.5 | 0.8 | x | 96.0% | 90.1% | x |
| Comparative Example 4A | 0.5 | 1.2 | 2.5 | 96.4% | 82.3% | 75.2% |
| Comparative Example 5A | 0.7 | x | x | 97.3% | x | x |
| Comparative Example 6A | 0.6 | 1.5 | 2.8 | 95.4% | 79.4% | 70.2% | x: indicates that crushing occurred during evaluation.

Prior to the formation of the carbon protective film by FCA method as obtained in Example 4, the magnetic recording medium with the carbon film containing nitrogen had maximum friction coefficient of 1.0 or less in the evaluation after the operation for 1000 hours. In contrast, in the magnetic recording medium obtained in the Comparative Example, crushing occurred due to the increase of friction force between the magnetic disk and the head before evaluation of 1000-hour operation, or the maximum friction coefficient was 1.0 or more, and the thickness of the remaining film was 80% or lower. Therefore, the magnetic recording medium using the carbon film prepared by FCA method according to the present embodiment as the multi-layer protective film provides stable lubricating effect and maintains the lubricating film thickness for long time.

FIG. 15 shows a magnetic disk device equipped with the magnetic disk of the Examples as given above. A magnetic disk 34 is mounted on a spindle 31, which is rotated by a spindle motor 30. A magnetic head 32 for writing and reading the information to and from the magnetic disk 9 is mounted on a slider 33, and the slider 33 is mounted on a suspension 36, which is connected to a rotary actuator arm 35 driven by a voice coil motor 34. The magnetic head 32 is moved in radial direction of the magnetic disk 9 by the voice coil motor 30, and information is written and read to and from the magnetic disk 9.

EXAMPLE 5

In this Example, as in Comparative Example 2, only a carbon film was directly laminated in thickness of 2 nm on the recording magnetic film 4 by cathodic arc deposition as the protective film in Example 1. However, in the present Example, positive bias voltage of 50 V was applied on the substrate for a certain period of time from the initiation of film formation in the film-forming process by cathodic arc deposition. In the present Example, carbon atoms were deposited at a rate of about $1.25 \times 10^{16}$ atoms per $cm^2$/sec by ion bundles entering the substrate. The formation of a carbon film with mass density of 2.8 $g \cdot cm^{-3}$ can be approximated as atom layers laminated in thickness of about 0.19 nm with surface density of about $2.7 \times 10^{15}$ atoms/$cm^{-2}$. Thus, the expected film-forming rate is 0.89 nm/sec., and this agreed well with the measured value. Therefore, an initial growing layer of about 0.5 nm in thickness is formed in 0.6 second. In the present Example, the time to apply positive bias voltage on the substrate was set to 0.7 second. By this Example, both the lower protective film 5 and the upper protective film 6 can be formed by cathodic arc deposition method and by controlling bias voltage. Also, similarly to Example 1, by providing the lower protective film 5, the penetration of carbon ions into the recording magnetic film 4 can be prevented during the formation of the upper layer protective film 6, and a magnetic recording medium with high magnetic characteristics can be produced.

EXAMPLE 6

Similarly to Comparative Example 2, the protective film was not formed in multiple layers in Example 1, and only a carbon film in thickness of 2 nm was directly laminated on the recording magnetic film 4 by cathodic arc deposition. However, in this Example, ethylene gas was introduced near the substrate only for 0.7 second from the initiation of film formation in the film-forming process of cathodic arc deposition.

TABLE 5

| | Rectangular ratio S* | Mr · δ(Gμm) | Coercive force (×10³ Oe) |
|---|---|---|---|
| Example.5 | 0.65 | 33.6 | 4.57 |
| Example 6 | 0.64 | 33.5 | 4.58 |
| Comparative Example.1 | 0.66 | 33.7 | 4.55 |

When magnetic characteristics of the magnetic disks prepared by the film-forming process of Examples 5 and 6 were measured, the magnetic characteristics approximately agreed with the results of Comparative Example .1 as shown in Table .5. In Example-5, positive bias voltage of 50 V was applied on the substrate for 0.7 second from the initiation of film formation in the film-forming process of cathodic arc deposition, and this bias voltage decelerated ions and prevented the penetration of carbon ions, which reached the recording magnetic film 4, and it was in preventing the changes of the magnetic characteristics. On the other hand, in Example 6, in the film-forming process of cathodic arc deposition, a part of ethylene gas introduced near the substrate for 0.7 second from the initiation of film formation was excited and decomposed and was turned to hydrocarbon radicals and were deposited on the recording magnetic film 4. Thus, the injection of carbon ions into the recording magnetic film 4 by cathodic arc deposition was prevented, and this was effective to prevent the changes of the magnetic characteristics.

As described above, according to the present invention, by the injection of carbon ions based on cathodic arc deposition, the penetration of carbon ions to the recording magnetic film can be prevented when an elaborate and hard carbon protective film having high sp3 carbon ratio is produced. Thus, it is possible to produce a magnetic recording medium having a hard, corrosion-resistant and highly wear resistant protective film without changing the magnetic characteristics.

According to the present embodiments, a carbon film containing nitrogen or hydrogen or a protective film containing boron nitride is formed prior to the formation of a carbon protective film by FCA method. Because the carbon protective film prepared by FCA method contains nitrogen or hydrogen or boron nitride, this contributes to the improvement of close adhesion between the protective film and the lubricating film. By the use of the magnetic recording medium of the present invention, it is possible to sufficiently suppress and prevent the splashing of the lubricant and to obtain a magnetic storage device with high reliability.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A method for manufacturing a magnetic recording medium, the method comprising:
   forming a first protective layer of first material over a magnetic film provided on a substrate, the first protective layer having a thickness of about 0.2 nm to about 2 nm;
   forming a second protective layer of second material over the first protective layer by driving ions of the second material into the first protective layer, the second protective layer being no more than 3 nm; and
   forming a lubricant film comprising fluoro-polyether above the second protective layer,
   wherein the second material comprises a tetrahedral amorphous carbon film,
   wherein the first protective layer is formed by sputtering method, and the second protective layer is formed by cathodic arc deposition method,
   wherein the first protective layer is configured to prevent the ions of the second material from penetrating into the magnetic film, and
   wherein the first protective layer is a carbon film including nitrogen in a range of 6–20 atomic %.

2. The method of claim 1, wherein the second protective layer consists essentially of carbon and is formed using a cathodic arc deposition method, and
   wherein the first protective layer includes silicon.

3. The method of claim 2, wherein the second protective layer having a mass density of at least about 2.5 g per cm3.

4. The method of claim 1, wherein the second protective layer is tetrahedral amorphous film of at least 80% tetrahedral structure.

5. The method of claim 1, wherein the second protective layer is at least 90% tetrahedral carbon structure.

6. The method of claim 1, wherein the second protective layer is formed by injecting carbon ions having energy of at least 30 eV into the first protective layer.

7. The method of claim 6, wherein the second protective layer is formed by injecting the carbon ions having energy of about 50 eV to about 100 eV or more into the first protective layer.

8. The method of claim 6, wherein the second protective layer is formed by injecting the carbon ions having energy of about 50 eV to about 70 eV into the first protective layer.

9. The method of claim 1, wherein the first protective layer is formed by a reactive sputtering deposition method.

10. The method of claim 1, wherein the first protective layer and the second protective layer comprise different materials.

11. A method for manufacturing a magnetic recording medium, the method comprising:
    forming a first protective layer of first material over a magnetic layer provided on a substrate, the first protective layer having a thickness of about 0.2 nm to about 2 nm;
    forming a second protective layer of second material over the first protective layer and the second material comprising tetrahedral carbon of at least 80% tetrahedral carbon structure, the second protective layer being no more than about 3 nm;
    forming a lubricant film comprising fluoro-polyether above the second protective layer,
    wherein the first protective layer is a carbon film including nitrogen in a range of 6–20 atomic %,
    wherein the first protective layer is formed using a sputtering method using a process gas including argon gas and nitrogen gas, the second protective layer being formed by injecting carbon ions having energy of 30–100 eV into the first protective layer, the second protective layer being formed using a cathodic arc deposition method,
    wherein the first protective layer is configured to prevent the ions of the second material from penetrating into the magnetic film.

12. The method of claim 11, wherein the first protective layer includes one of the following material: silicon, boron, a non-magnetic metal or its oxide, and
    wherein the second protective layer has a mass density of 2.5 g per cm$^3$.

13. A method for manufacturing a magnetic recording medium, the method comprising:
    forming a first protective layer of first material over a magnetic layer provided over a substrate, the first protective layer having a thickness of about 0.2 nm to about 2 nm;
    injecting carbon ions having at least about 50 eV into the first protective layer to form a second protective layer of second material over the first protective layer, the second protective layer having a thickness of about 1 nm to about 2 nm; and
    forming a lubricant film comprising fluoro-polyether above the second protective layer,
    wherein the first protective layer is configured to prevent the carbon ions from penetrating into the magnetic layer,
    wherein the first protective film is a carbon film including nitrogen in a range of 6–20 atomic %,
    wherein the second material comprises a tetrahedral amorphous carbon film,
    wherein the first protective layer is formed by a sputtering method, and the second protective layer is formed by a cathodic arc deposition method.

14. The method of claim 13, wherein the first protective layer and the second protective layer comprise different materials.

15. The method of claim 13, further comprising:
    providing a graphite cathode; and
    emitting the carbon ions from the graphite cathode, wherein the emitted carbon ions are directed to the first protective layer without applying a bias power to the substrate.

16. The method of claim 13, wherein the second protective layer has a mass density of about 2.5 g per cm$^3$ and at least 90% tetrahedral structure.

* * * * *